CHARLES C. ALGEO.
Improvement in Fireplace Fenders.
No. 115,265.                                     Patented May 30, 1871.
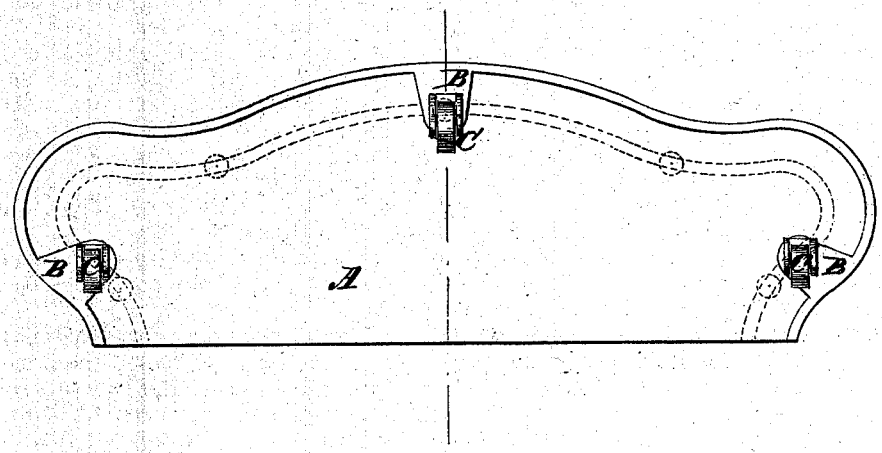
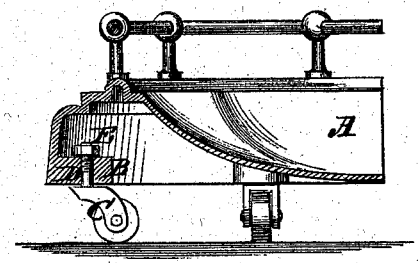

UNITED STATES PATENT OFFICE.

CHARLES C. ALGEO, OF PITTSBURG, PENNSYLVANIA.

IMPROVEMENT IN FIRE-PLACE FENDERS.

Specification forming part of Letters Patent No. 115,265, dated May 30, 1871.

*To all whom it may concern:*

Be it known that I, CHARLES C. ALGEO, of Pittsburg, in the county of Allegheny and State of Pennsylvania, have invented a new and Improved Fire-Place Fender; and I do hereby declare that the following is a full, clear, and exact description thereof, which will enable others skilled in the art to make and use the same, reference being had to the accompanying drawing forming part of this specification.

This invention relates to improvements in the application of casters or rollers to fire-grate fenders for rolling over the floor when it is desirable to move them to save the labor of lifting them; and it consists in extending the shanks or ears of the casters up through ears or flanges extending from the inner wall of the base of the fender, and securing them by nuts screwed on above the said ears or flanges to prevent the casters from dropping out when lifted.

Figure 1 is a plan of the bottom of a fender with the casters attached according to my improvements, and Fig. 2 is a section of the same on the line $x\ x$ of Fig. 1.

Similar letters of reference indicate corresponding parts.

A is the cast-iron fender, which is of ordinary construction, except that it is provided with ears B projecting from the inner wall of the base of the fender. C is the caster, which I propose to attach to the fender by fitting the shank or spindle D in the ears so as to extend up through it and receive a screw-threaded nut, E, at the top, which is screw-threaded for the purpose. The nut is so fitted on as not to prevent the caster from turning. It may have a washer between it and the upper side of the ear.

Having thus described my invention, I claim as new and desire to secure by Letters Patent—

The attachment of the casters to the fender A by the screw-threaded shanks extending up through the ears, and the nuts screwed on the shanks above the ears, all substantially as specified.

CHARLES C. ALGEO.

Witnesses:
J. H. HILLERMAN,
W. J. PERRY.